(12) United States Patent
Goldberg

(10) Patent No.: US 6,648,531 B1
(45) Date of Patent: Nov. 18, 2003

(54) SIMULTANEOUS KEYBOARD KEY PRESS

(75) Inventor: Mark Goldberg, Lido Beach, NY (US)

(73) Assignee: Systemax, Inc., Port Washington, NY (US)

( * ) Notice: Subject to any disclaimer, the term of this patent is extended or adjusted under 35 U.S.C. 154(b) by 0 days.

(21) Appl. No.: 10/167,731

(22) Filed: Jun. 11, 2002

(51) Int. Cl.[7] .............................................. G06F 3/02
(52) U.S. Cl. ..................................... 400/473; 73/865.3
(58) Field of Search ........................... 73/865.3, 865.9; 400/472, 473, 474

(56) References Cited

U.S. PATENT DOCUMENTS

| 2,535,178 | A | * | 12/1950 | Walker ........................ 235/146 |
| 3,950,634 | A | * | 4/1976 | Speiser .................... 235/145 R |
| 4,682,695 | A | * | 7/1987 | Hasenbalg .................. 209/571 |
| 5,192,152 | A | * | 3/1993 | Silvestri et al. ............. 400/679 |
| 6,304,830 | B1 | * | 10/2001 | Lee ............................ 702/114 |
| 6,314,825 | B1 | * | 11/2001 | Fan ........................... 73/865.3 |

FOREIGN PATENT DOCUMENTS

| JP | 61100824 | A | * | 5/1986 | ............. G06F/3/02 |
| JP | 62245428 | A | * | 10/1987 | ............. G06F/3/02 |
| JP | 05257584 | A | * | 10/1993 | ............. G06F/3/02 |
| JP | 09146673 | A | * | 6/1997 | ............. G06F/3/02 |

* cited by examiner

*Primary Examiner*—Dan Colilla
(74) *Attorney, Agent, or Firm*—Gibbons, Del Deo, Dolan, Griffinger & Vecchione, P.C.

(57) ABSTRACT

An apparatus and method of simultaneously pressing different keyboard keys mechanically. The apparatus includes a displacement mechanism that is held by a main carrier that may slide back and forth along an elevated track. The displacement mechanism holds a further track. Further carriers may slide back and forth to desired positions along the further track. Each further carrier holds a rod, whose position relative to the respective further carrier is adjustable. Each rod has an end that constitutes a pressing surface. The displacement mechanism includes a plunger that may be manually pressed against spring bias to lower the further track and thereby the further carriers and the further rods. By doing so, the pressing surfaces of the rods may press against keys of different keyboards that are in alignment beneath the pressing surfaces.

13 Claims, 1 Drawing Sheet

SIMULTANEOUS KEYBOARD KEY PRESS

BACKGROUND OF THE INVENTION

1. Field of the Invention

The present invention relates to an apparatus and method to simultaneously press keyboard keys of different keyboards mechanically.

2. Description of Related Art

There are computer applications that involve multiple computers and require pressing the same key of different keyboards simultaneously, such as an ENTER key. Conventionally, this task of pressing the same key simultaneously for different keyboards has been accomplished manually. An alternative solution is desired.

SUMMARY OF THE INVENTION

One aspect of the invention resides in an apparatus and method of simultaneously pressing different keyboard keys mechanically. The apparatus includes a displacement mechanism that is held by a main carrier that may slide back and forth along an elevated track. The displacement mechanism holds a further track. Further carriers may slide back and forth to desired positions along the further track. Each further carrier holds a rod, whose position relative to the respective further carrier is adjustable. Each rod has an end that constitutes a pressing surface. The displacement mechanism includes a plunger that may be manually pressed against spring bias to lower the further track and thereby the further carriers and the further rods. By doing so, the pressing surfaces of the rods may press against keys of different keyboards that are in alignment beneath the pressing surfaces. Once the manual pressing force is released, the spring bias exerts a force that returns the plunger to its original position, which lifts the further track and thereby lifts the further carriers and the rods. The pressing surfaces thereby lift so that the depressed keys may resiliently return to their original position on their own.

BRIEF DESCRIPTION OF THE DRAWING

For a better understanding of the present invention, reference is made to the following description and accompanying drawings, while the scope of the invention is set forth in the appended claims:

DETAILED DESCRIPTION OF THE INVENTION

Figures 1, 2:
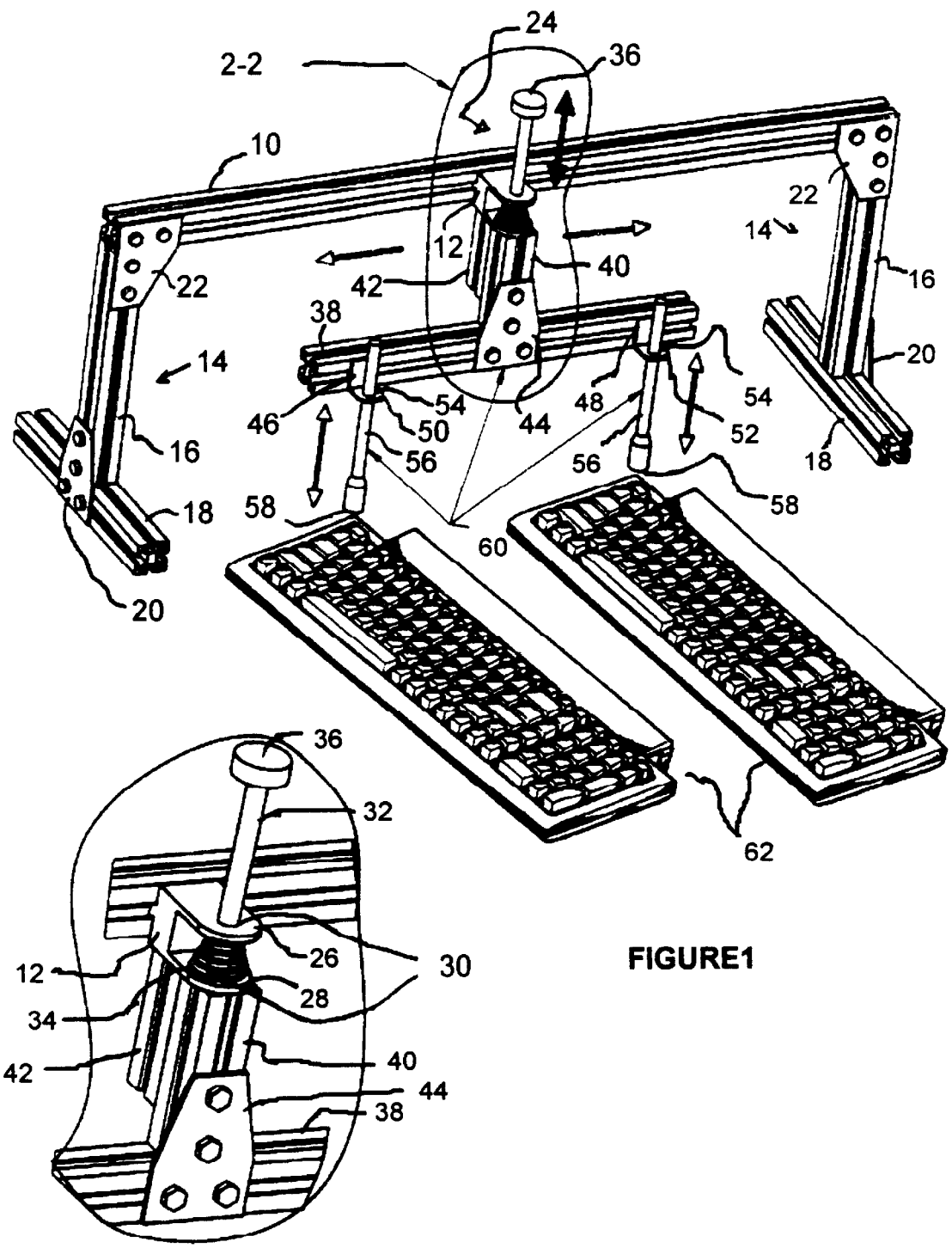
FIG. 1 is a perspective view of a mechanism to simultaneously press keyboard keys in accordance with the invention.
FIG. 2 is an enlargement of 2—2 of FIG. 1.

Turning to the drawing, FIG. 1 shows a main track 10 that is supported by two legs 14 so that the main track 10 is elevated. A main carrier 12 is provided that has a slide wedge that fits within a recessed groove of the main track 10 to permit the main carrier 12 to slide back and forth to a desired position. Each of the legs 14 include a vertical member 16 and a base member 18. A fastener plate 20 secures the vertical member 16 to the base member 18. A further fastener plate 22 secures the vertical member to the main track 10 and is situated at an end of the main track 10 to block the main carrier 12 from sliding off the main track 10.

A displacement mechanism 24 is provided that is attached to the main carrier 12. The displacement mechanism includes a two plates 26, 28 that extend from the main carrier 12. The plates 26, 28 have aligned holes 30. A plunger rod 32 passes through both holes 30. A spring 34 is attached at one end to the plunger rod 32 and rests against the plate 28, which is lower than the plate 26. The attachment location of the spring 34 to the plunger rod 32 is between the two plates 26, 28. Thus, the plunger rod 32 has a head 36 that may be pressed under manual force to drive the plunger rod 32 to compress the spring 34, but the maximum distance that the plunger may travel is the spacing between the two plates 26, 28.

The displacement mechanism 24 supports a further track 38 by a further vertical member 40, which moves in unison with the plunger rod 32 since they are attached together. A guide track 42 is provided to help ensure that the relative movement of the further vertical member 40 does not twist while being driven by the plunger rod 32. An additional fastener plate 44 is used to secure the further vertical member 40 to the further track 38.

Two further carriers 46, 48 are provided that are attached to the further track 38 in a recessed groove of the further track 38. Each further carrier 46 may have a slide wedge that is fitted within the recessed groove of the track 38. The additional fastener plate 44 is situated between the two further carriers 46, 48 so as to block the two further carriers 46, 48 from being slid into each other.

Each of the two further carriers 46, 48 has a respective further plate 50, 52 with a respective hole 54. Two pressing rods 56 are fitted within respective ones of the holes 54 of the further plates 50, 52 so that their pressing surfaces 58 face downwardly. The pressing surfaces 58 may be wider than a diameter of the pressing rods 56. The reference numeral 60 identifies components that are adjustable. The pairs of direction arrows signify the back and forth direction that the associated components may move.

The setup is as follows for depressing two keys of different keyboards 62 simultaneously. The two keyboards 62 are arranged neighboring each other so that the two keys to be pressed simultaneously are separated from each other by a distance no greater than the w length of the further track 38. The legs 12 are positioned on a flat surface, such as the table, desk or counter top on which rests the keyboards, so that the keyboards are clear of the base members 18. The pressing surfaces 58 are separated from each other by a separation distance that approximately matches the separation distance between the two keys to be pressed. The two further carriers 46, 48 are slid along the further track 38 as necessary until a matching separation distance is attained.

Next, the main carrier 12 is slid along the main track 10 until the pressing surfaces 58 are in alignment with the keys of the keyboards 62 to be pressed simultaneously. The pressing surfaces 58 preferably are almost in contact, if not in contact, with the keys themselves. The pressing surfaces 58 should be at the same elevation. The setup is now complete.

The operation to press the keyboard keys simultaneously is quick and simple. All that is required is that the head 36 of the plunger rod 32 be manually driven downward. The plunger rod 32 only travels at most by a distance equal to the distance between the two plates 26, 28, which is preferably sized at least as much as the distance required for the pressing surfaces 58 to press the keys far enough to effect an activation signal by the keyboard from the key press. Once the plunger rod 32 is driven as far all possible, its downward movement ceases, with the spring 34 compressed. The head 36 is then released, which allows the bias force of the spring 34 to return the plunger rod 32 and head 36 to their original position before they were manually driven. The keyboard keys that were pressed now are free to resiliently return to their non-pressed state. All the components between the pressing surfaces 58 and the plunger rod 32 may be considered to be a type of connection linkage.

By adding still more further carriers 46, 48 and pressing rods 56 with pressing surfaces 58 on the further track 38, it is possible to simultaneously press more than two keys. Also, by extending the length of the main track 10 and the further track 38, keys of even more keyboards may be simultaneously pressed. That is, keys on three, four or more keyboards may be simultaneously pressed. Alternatively, further displacement mechanisms 24 may be added to the main track 10, which may be further elongated, that hold an additional further track 38, further carriers 46, 48, pressing rods 56 and pressing surfaces 58 to simultaneously press more keys of different keyboards by pressing the multiple heads 36 of the plunger rods 32 simultaneously.

While the foregoing description and drawings represent the preferred embodiments of the present invention, it will be understood that various changes and modifications may be made without departing from the spirit and scope of the present invention.

What is claimed is:

1. A simultaneous mechanical activator of keyboard keys, comprising
    a main track;
    a main carrier held by said main track and arranged so as to permit the main carrier to slide back and forth along the main track;
    a displacement mechanism attached to the main carrier, the displacement mechanism including a plunger movable back and forth between a retracted position and an extended position;
    at least two pressing surfaces arranged to move in unison with the plunger and spaced apart from each other and away from said plunger; and
    a connection linkage between the at least two pressing surfaces and the plunger.

2. An activator as in claim 1, wherein said connection linkage includes a further track and two further carriers held by said further track so as to permit the further carriers to slide back and forth along the further track, said connection linkage further includes pressing rods that are held by respective ones of said further carriers and have ends, said pressing surfaces being at respective ones of said ends of said pressing rods.

3. An activator as in claim 2, wherein said pressing rods and said carriers are configured so that said pressing rods are movable relative to said further carriers into desired relative positions.

4. An activator as in claim 3, wherein said pressing rods are movable relative to said further carriers in a common direction with that which said plunger rod may be moved back and forth.

5. An activator as in claim 1, further comprising legs that support said main track to elevate same.

6. An activator as in claim 1 in combination with at least one keyboard having keys in alignment with said pressing surfaces.

7. An activator as in claim 1 in combination with a plurality of keyboards each having at least one key in alignment with associated ones of said pressing surfaces.

8. An activator as in claim 1, wherein the displacement mechanism further includes two plates each having a hole in alignment with each other, the plunger having a rod passing through said holes, and a spring around said rod and located with a space defined between said plates, said spring being arranged to exert a spring bias to restore the plunger to the retracted position in response to removal of forces that drive the plunger to the extended position.

9. An activator as in claim 1, wherein said connection linkage includes a vertical member attached to said plunger, further comprising a guide adjacent said vertical member to permit said vertical member to move along said guide without twisting.

10. A method of simultaneous mechanical activator of keyboard keys, comprising the steps of sliding a main carrier along a main track to a desired position, manually pressing a plunger of a displacement mechanism from a retracted position to an extended position, which in turn drives at least two pressing surfaces in unison against at least two keyboard keys, the pressing surfaces being spaced apart and from said plunger.

11. A method as in claim 10, wherein the at least two keyboard keys are each integral with different keyboards.

12. A method as in claim 10, further comprising releasing the plunger, spring biasing the plunger back to an original position together with the two pressing surfaces.

13. A method as in claim 10, further comprising adjusting a relative position of said pressing surfaces with respect to said plunger before manually pressing the plunger.

* * * * *